United States Patent
Isa et al.

(10) Patent No.: US 7,239,169 B2
(45) Date of Patent: Jul. 3, 2007

(54) SEMICONDUCTOR APPARATUS CAPABLE OF PREVENTING OCCURRENCE OF MULTIPLE REFLECTION, DRIVING METHOD, AND SETTING METHOD THEREOF

(75) Inventors: Satoshi Isa, Tokyo (JP); Seiji Funaba, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 130 days.

(21) Appl. No.: 10/226,777

(22) Filed: Aug. 23, 2002

(65) Prior Publication Data
US 2003/0052345 A1 Mar. 20, 2003

(30) Foreign Application Priority Data
Aug. 23, 2001 (JP) ............................. 2001-252434

(51) Int. Cl.
*H03K 17/16* (2006.01)
(52) U.S. Cl. ..................... 326/30; 326/86; 327/315
(58) Field of Classification Search ............... 326/30, 326/86; 327/321, 315
See application file for complete search history.

(56) References Cited

U.S. PATENT DOCUMENTS

| | | | |
|---|---|---|---|
| 4,760,292 A * | 7/1988 | Bach | 326/86 |
| 4,859,877 A * | 8/1989 | Cooperman et al. | 326/30 |
| 5,548,226 A | 8/1996 | Takekuma et al. | |
| 5,686,872 A | 11/1997 | Fried et al. | |
| 6,265,893 B1 * | 7/2001 | Bates | 326/30 |
| 6,473,886 B2 * | 10/2002 | Kitamura | 716/4 |

FOREIGN PATENT DOCUMENTS

JP 1-169946 7/1989

OTHER PUBLICATIONS

Patent Abstract of Japan No. 04000912 A, dated Jan. 6, 1992.
Patent Abstract of Japan No. 03085015 A, dated Apr. 10, 1991.

* cited by examiner

*Primary Examiner*—Daniel Chang
(74) *Attorney, Agent, or Firm*—Scully, Scott, Murphy & Presser, P.C.

(57) ABSTRACT

A semiconductor apparatus comprises a resistor formed in a driver to connect a driving device to a transmission line connecting the driver to a receiver. The resistor has resistance considerably larger than on-state resistance of the driving device on condition that the resistor matches output impedance of the driver with impedance of the transmission line. The transmission line has length decided so that a reflected wave from a receiver-side end of the transmission line reaches the driver while a driving signal supplied to the driver has a logical high or low level.

14 Claims, 8 Drawing Sheets

SEMICONDUCTOR APPARATUS CAPABLE OF PREVENTING OCCURRENCE OF MULTIPLE REFLECTION, DRIVING METHOD, AND SETTING METHOD THEREOF

BACKGROUND OF THE INVENTION

This invention relates to a semiconductor apparatus, in particular, to a semiconductor apparatus comprising a driving device and a driven device which are connected with a transmission line.

A related semiconductor apparatus comprises a driver (or a driving device), a receiver (or a driven device) and a transmission line (or a bus) connected between the driver and the receiver. The driver has output impedance Zout while the transmission line has impedance Z0.

If the driver, the receiver and the transmission line are ideal, an output signal of the driver travels to the receiver on the transmission line without being damped. Then, the signal is totally reflected by the receiver (or at a receiver-side end of the transmission line) and returns to the driver without being damped. If the output impedance Zout is equal to the impedance Z0, the reflected signal is terminated (or absorbed) at a driver-side end of the transmission line (or at a connection point between the transmission line and the driver).

However, the output impedance Zout actually depends on a voltage of the output signal because the driver is not ideal. Accordingly, part of the reflected signal is further reflected by the driver (or at the driver-side end of the transmission line) and travels for the receiver again. Thus, the output signal of the driver is repeatedly reflected by the receiver and the driver.

To suppress the above mentioned multiple reflection between the driver and the receiver, another related semiconductor apparatus has a terminating resistor connected to the receiver-side end of the transmission line.

However, the terminating resistance uselessly consumes electric power. That is, the semiconductor apparatus including the terminating resistor has high electricity consumption. Furthermore, the terminating resistance increases manufacturing steps of the semiconductor apparatus and thereby increases the production cost of the semiconductor apparatus.

SUMMARY OF THE INVENTION

It is therefore an object of this invention to provide a semiconductor apparatus capable of preventing multiple reflection from occurring on a transmission line connecting a driver and a receiver without increase of electricity consumption and production cost.

Other object of this invention will become clear as the description proceeds.

According to a first aspect of this invention, a semiconductor apparatus has a driver with a driving device and a transmission line connected to an output side of the driver. The driver has output impedance. The driving device has on-state resistance. The transmission line has impedance. The semiconductor apparatus comprises a resistor formed in the driver to connect the driving device to the transmission line. The resistor has resistance larger than the on-state resistance on condition that the output impedance of the driver matches the impedance of the transmission line.

According to a second aspect of this invention, a semiconductor apparatus has a driver with a driving device and a transmission line connected to an output side of the driver. The driver has output impedance and a current-voltage characteristic. The driving device has on-state resistance. The transmission line has impedance. The semiconductor apparatus comprises a resistor located in the driver to connect the driving device to the transmission line and to match the output impedance with the impedance of the transmission line. The resistor has resistance which is larger than the on-state resistance to approximate the current-voltage characteristic to a linear characteristic.

According to a third aspect of this invention, a driving method is for driving semiconductor apparatus by the use of a driving signal varying between a logical high level and a logical low level. The semiconductor apparatus has a driver with a driving device and a transmission line connected to the driver. The driver has a current-voltage characteristic and output impedance. The driving device has on-state resistance. The transmission line has impedance and an end reflecting an output signal from the driver as a reflected wave. The driving method comprises the steps of previously locating a resistor in the driver for connecting the driving device to the transmission line to match the output impedance with the impedance of the transmission line when the driving signal has the logical high level or the logical low level, the resistor having resistance larger than the on-state resistance to approximate the current-voltage characteristic to a linear characteristic, and supplying the driving signal with a predetermined data rate to the driver, the predetermined data rate decided so that the driving signal has the logical high level or the logical low level when the reflected wave reaches said driver.

According to a fourth aspect of this invention, a semiconductor apparatus comprises a driver which has an MOS transistor with a gate supplied with a driving signal and a resistor with two terminals connected to one end of a transmission line and to a source or a drain of the MOS transistor. A receiver is connected to the other end of the transmission line. The resistor has resistance which substantially matches output impedance of the driver with impedance of the transmission line while the driving signal has logical high or low level.

According to a fifth aspect of this invention, a setting method is for setting semiconductor apparatus which comprises a driver and a receiver. The driver has an MOS transistor with a gate supplied with a driving signal and a resistor with two terminals connected to one end of a transmission line and to a source or a drain of the MOS transistor. The receiver is connected to the other end of the transmission line. The setting method comprises the steps of previously finding electric characteristics of the semiconductor apparatus without the resistor, and setting resistance of the resistor on the basis of the electric characteristics so that output impedance of the driver substantially matches impedance of the transmission line while the driving signal has logical high or low level.

DESCRIPTION OF THE PREFERRED EMBODIMENTS

Referring to FIGS. 1 to 5, description will be at first directed to a related semiconductor apparatus for a better understanding of this invention.

Figure 1:
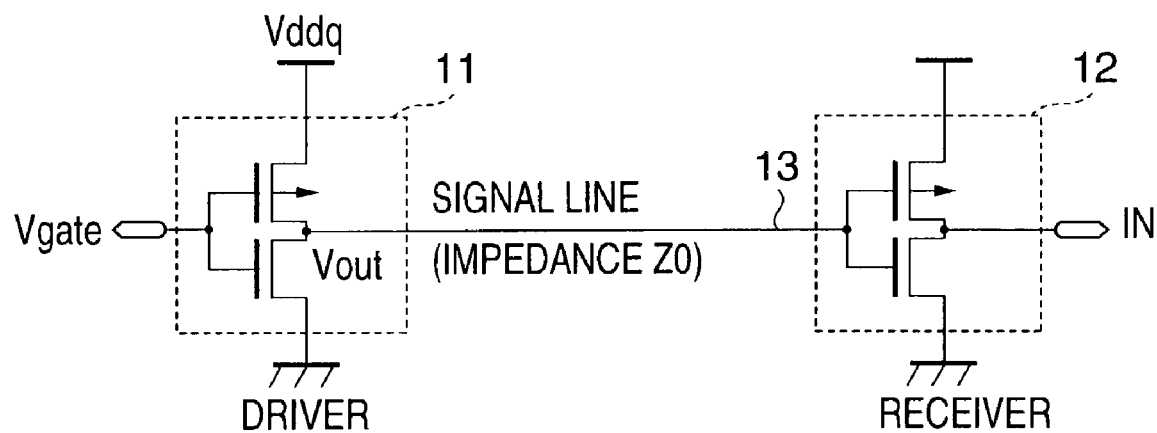
FIG. 1 is a circuit diagram of a related semiconductor apparatus.

In FIG. 1, the related semiconductor apparatus comprises a driver (or a driving device) 11, a receiver (or a receiving device) 12 and a transmission line (or a bus) 13 connecting the driver 11 to the receiver 12.

The driver 11 and the receiver 12 each comprise a CMOS inverter which has a p-channel MOS transistor and an n-channel MOS transistor. The transmission line 13 comprises, for example, an aluminum wire.

Figure 2:
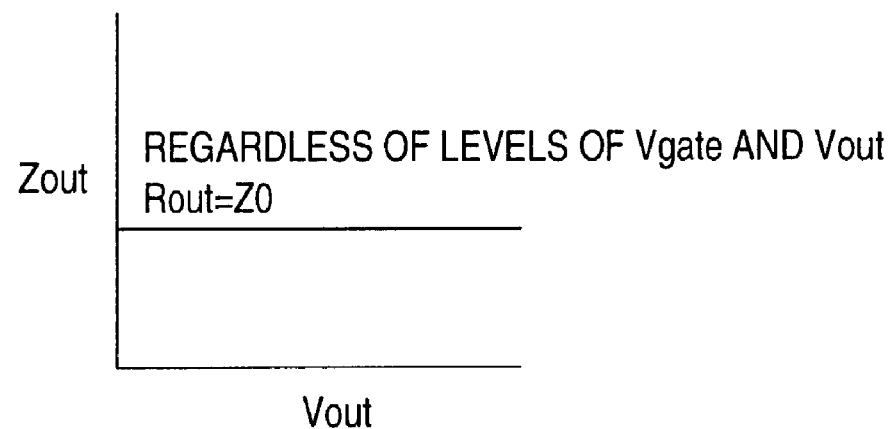
FIG. 2 is a graph showing an output impedance characteristic of a driver used in the related semiconductor apparatus of FIG. 1.

If the driver 11 is an ideal linear driver, it has output impedance Zout as illustrated in FIG. 2. That is, the output impedance Zout can be regarded as a fixed resistor with resistance Rout regardless of an output level (or voltage) Vout. In this case, an ideal equivalent circuit of the semiconductor apparatus of FIG. 1 is as illustrated in FIG. 3A.

Figures 3A, 3B:
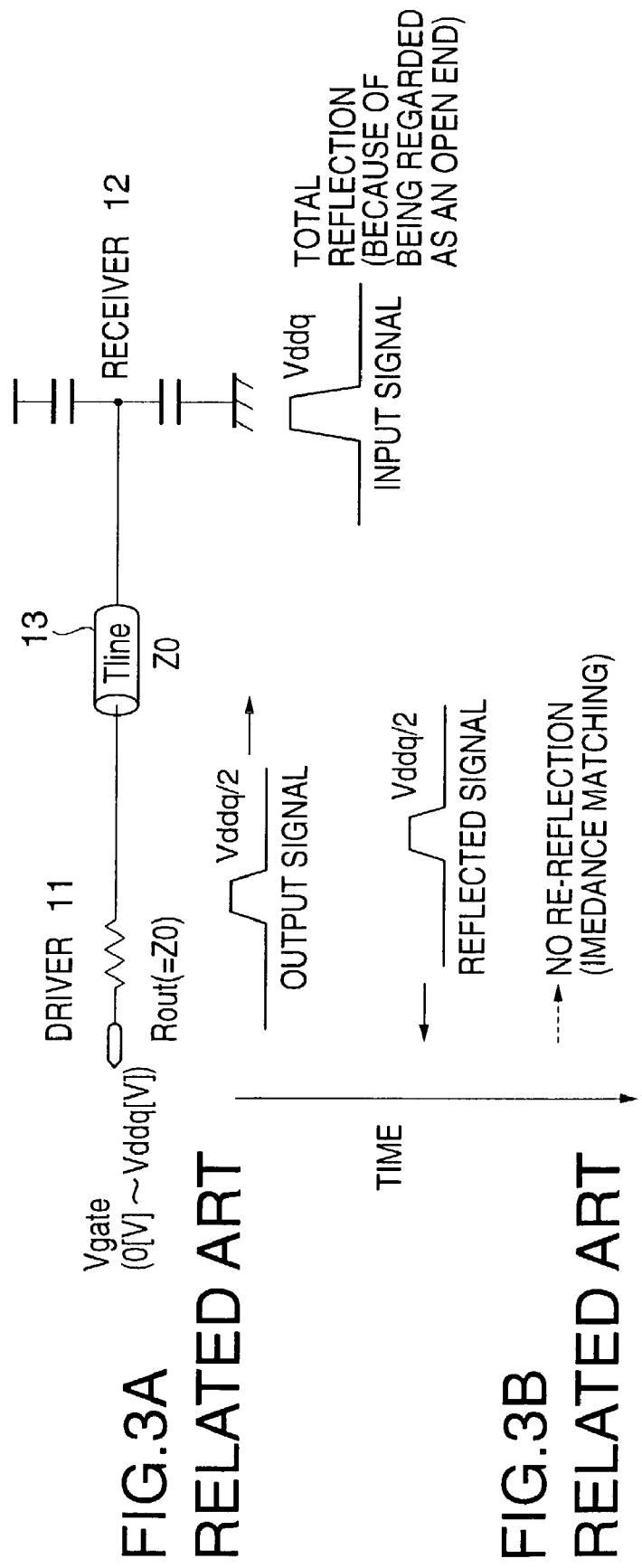
FIG. 3A shows an ideal equivalent circuit of the related semiconductor apparatus of FIG. 1.
FIG. 3B is a diagram for describing transmission of a signal in the ideal equivalent circuit of FIG. 3A.

When the output impedance Zout (=Rout) of the driver 11 is equal to impedance Z0 of the transmission line 13, the driver 11 produces an output signal having the output level of Vddq/2 volts as illustrated in FIG. 3B. If a signal wave travelling on the transmission line is not dumped by the transmission line, the output signal of the driver 11 travels to the receiver 12 without being damped. Because the receiver 12 is regarded as an open end, the output signal of the driver 11 is completely reflected thereat. In other words, the output signal is totally reflected at a receiver-side end of the transmission lien 13. Consequently, the output signal returns to the driver 11 as a reflected wave.

The receiver 12 receives an input signal of Vddq volts because the output signal of the driver 11 overlaps with the reflected wave reflected by the receiver 12 thereat.

As mentioned above, the output signal of the driver 11 returns to the driver 11 as the reflected wave reflected by the receiver 12. Because the output impedance Zout (=Rout) is equal to the characteristic impedance Z0 (=Rout) in this case, the reflected wave is not at all reflected by the driver 11. In other words, the reflected wave is terminated or absorbed at a driver-side end of the transmission line 13.

Figure 4:
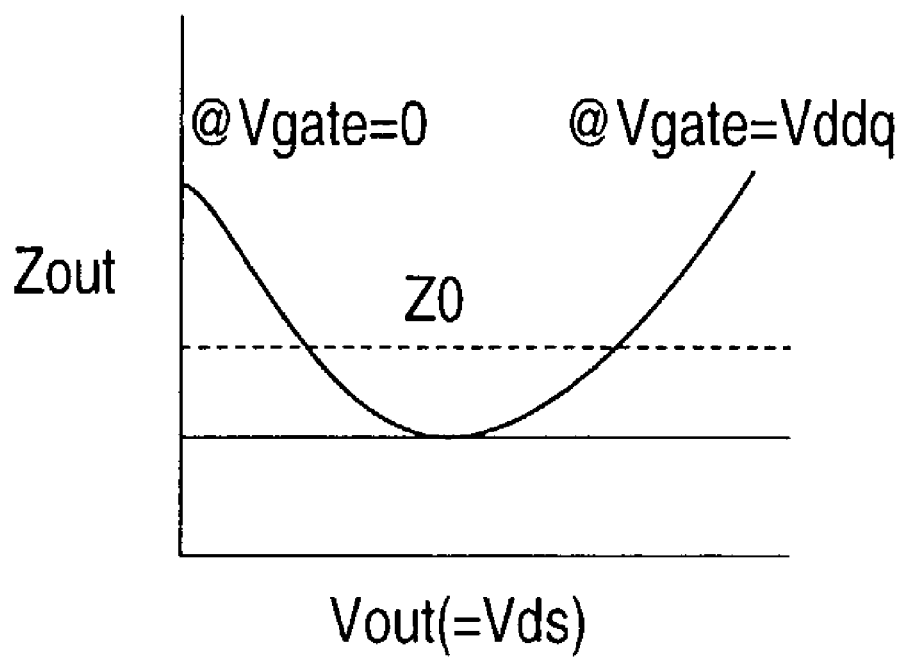
FIG. 4 is a graphic diagram showing an output impedance characteristic of an actual driver.

However, the driver 11 actually has an output characteristic as shown in FIG. 4. That is, the output impedance Zout of the driver 11 changes according to gate voltage Vgate and the output voltage Vout of the driver 11 is not always equal to the characteristic impedance Z0 of the transmission line 13. Accordingly, an actual equivalent circuit of the semiconductor apparatus of FIG. 1 is as illustrated in FIG. 5A.

Figures 5A, 5B:
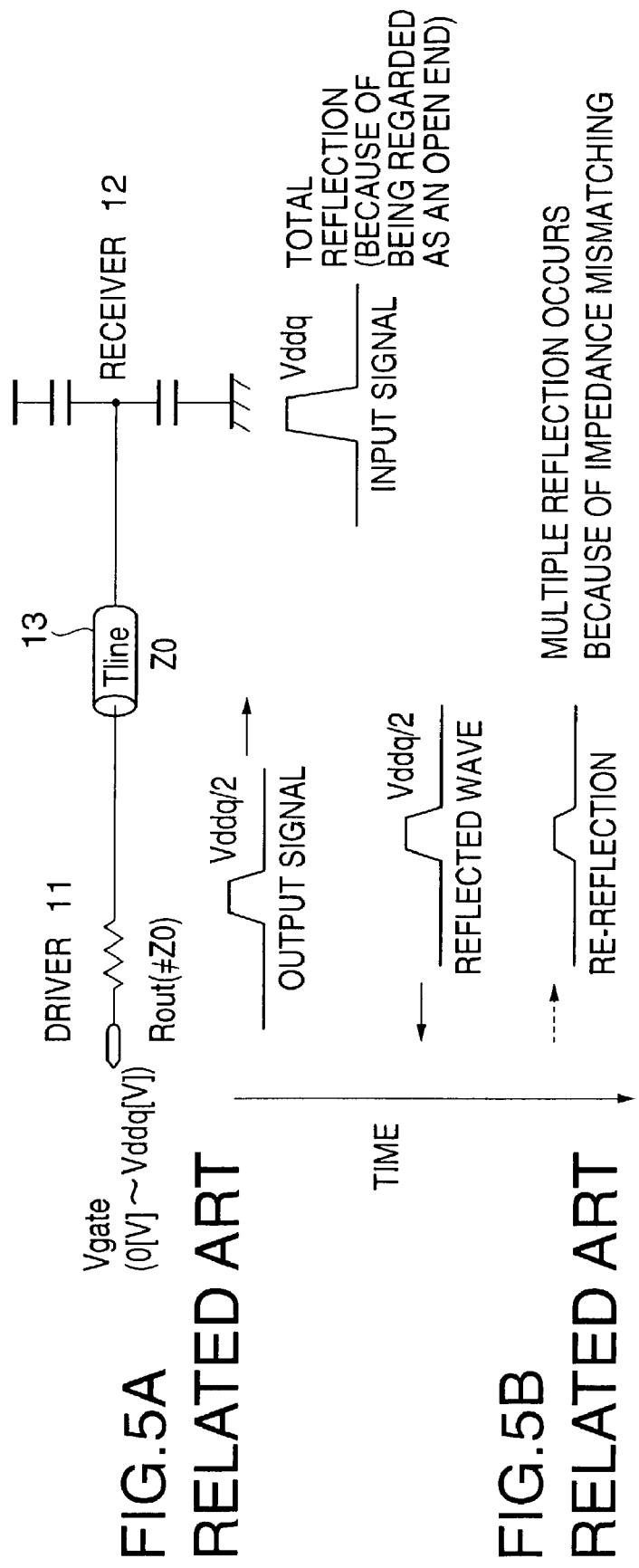
FIG. 5A shows an actual equivalent circuit of the related semiconductor apparatus of FIG. 1.
FIG. 5B is a diagram for describing transmission of a signal in the actual equivalent circuit of FIG. 3B.

In the semiconductor apparatus of FIG. 5A, the reflected wave reflected by the receiver 12 returns to the driver 11. The driver 11 partly reflects the reflected wave from the receiver 12 as illustrated in FIG. 5B because of impedance mismatching between the output impedance Zout and the impedance Z0 of the transmission line 13. The reflected wave reflected by the driver 11 travels again to the receiver 12 on the transmission line 13. Thus, the reflected wave is repeatedly reflected by the driver 11 and the receiver 12 and goes back and force between the driver 11 and the receiver 12 many times. That is, multiple reflection is caused between the driver 11 and the receiver 12 in the semiconductor apparatus of FIG. 5A.

There is another related semiconductor apparatus disclosed in Japanese Unexamined Patent Publication NO. 1-169946 as that which can prevent the multiple reflection from occurring. The semiconductor apparatus disclosed in the above Publication is illustrated in FIG. 6.

Figure 6:
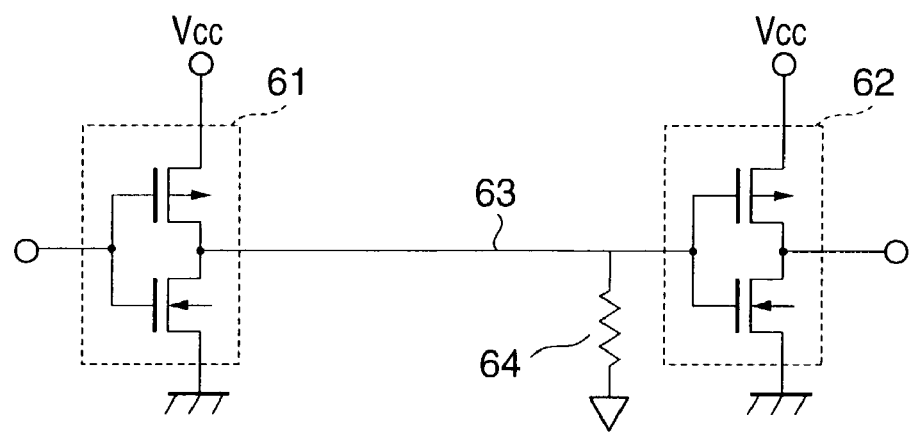
FIG. 6 is a circuit diagram of another related semiconductor apparatus.

As shown in FIG. 6, the semiconductor apparatus comprises a driver 61, a receiver 62, a transmission line 63 connecting the driver 61 to the receiver 62, and a terminating resistor 64 with an end connected to a receiver-side end of the transmission line 63. The terminating resistor 64 has resistance equal to the impedance of the transmission line 63 to prevent a reflected wave from occurring.

Referring to FIGS. 7 to 11, the description will proceed to a semiconductor apparatus according to a preferred embodiment of this invention.

Figure 7:
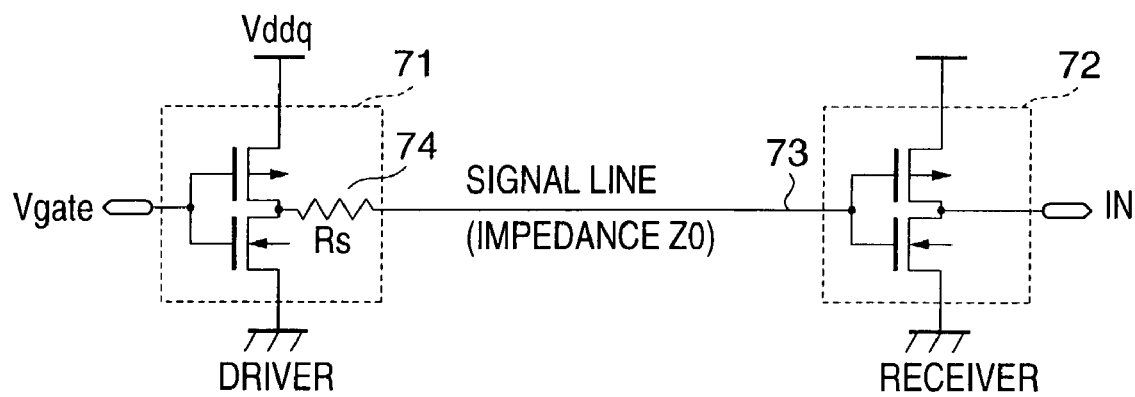
FIG. 7 is a circuit diagram of a semiconductor apparatus according to a preferred embodiment of this invention.

In FIG. 7, the semiconductor apparatus comprises a driver 71, a receiver 72 and a transmission line 73 connecting an output terminal of the driver 71 to the receiver 72. The driver 71 comprises a first CMOS inverter (or a driving device) and a resistor 74. The receiver 72 comprises a second CMOS inverter. Each of the first and second CMOS inverters comprises a PMOS transistor and a NMOS transistor which are serially connected to each other between a power source wire and a grounding wire. The first and second CMOS inverters are simultaneously formed on a semiconductor substrate (not shown) by a common process while the resistor 74 is an on-chip type and made during the common process for the CMOS inverters.

Figures 8A, 8B:
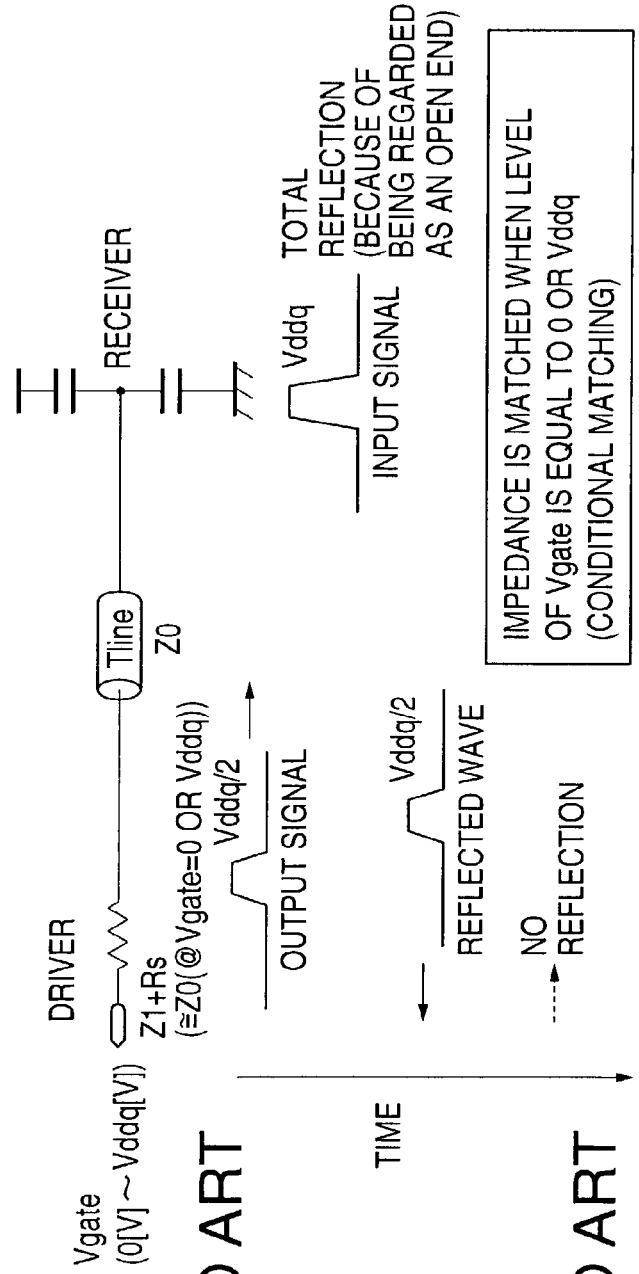
FIG. 8A shows an equivalent circuit of the semiconductor apparatus of FIG. 7.
FIG. 8B is a diagram for describing transmission of an output signal in the equivalent circuit of FIG. 3B.

FIG. 8A shows an equivalent circuit of the semiconductor apparatus which FIG. 8B shows signal waveforms of a signal traveling on the signal lime 73. The driver 71 has output impedance Zout. When the first CMOS inverter has output impedance Z1 and the resister 74 has resistance Rs, the output impedance Zout of the driver 71 is equal to a sum of the output impedance Z1 of the first CMOS inverter and the resistance Rs of the resister 74 as shown in FIG. 8A. That is, the output impedance Zout of the driver 71 is represented by the following equation.

$$Zout = Z1 + Rs$$

The output impedance Zout of the driver 71 that is equal to impedance Z0 of the transmission line 73 is necessary to prevent a reflected wave traveling to the driver 71 on the transmission line 73 from being reflected by the driver 71.

Accordingly, the resistance Rs of the resistor 74 is decided to meet the following equation.

$$Zout = Z1 + Rs$$
$$= (or \approx) Z0$$

However, the output impedance Z1 of the first CMOS inverter changes according to its operating state. The NMOS transistor used for the first CMOS inverter has a current-voltage (I-V) characteristic illustrated in FIG. 9A.

Figure 9A:
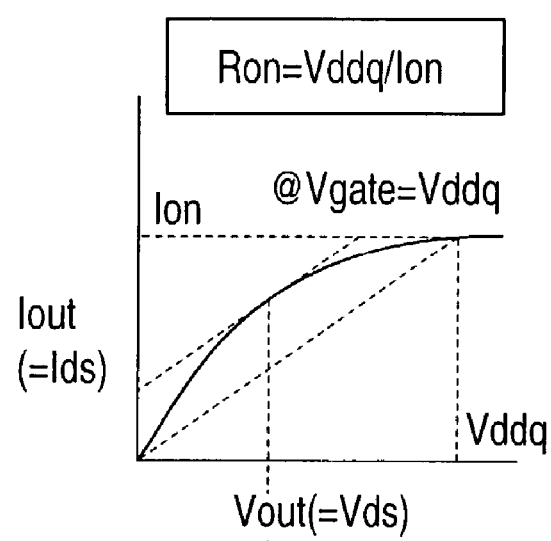
FIG. 9A is a graphic diagram showing a current-voltage characteristic of an NMOS transistor applicable to the semiconductor apparatus of FIG. 7.

In FIG. 9A, a horizontal axis represents drain-source voltage Vout of the NMOS transistor while a vertical axis represents a drain-source current Iout of the NMOS transistor. When gate voltage Vgate of the NMOS transistor is equal to voltage of Vddq, the drain-source current Iout is equal to an current Ion.

Figure 9B:
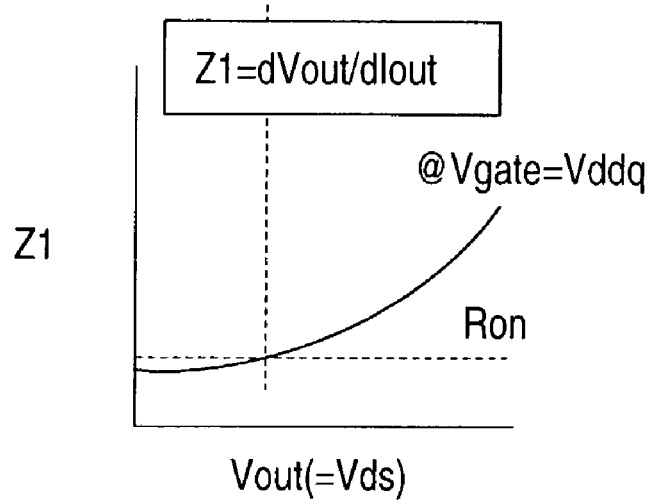
FIG. 9B is a graphic diagram showing an output impedance characteristic of CMOS inverter applicable to the semiconductor apparatus of FIG. 7.

The output impedance Z1 of the first CMOS inverter changes according to output voltage of the first CMOS inverter as shown in FIG. 9B because the NMOS transistor has the I-V characteristic of FIG. 9A. On-state resistance Ron shown in FIG. 9A is found by the following equation.

$$Ron = Vddq/Ion$$

In a case where the resistor 74 is merely connected to the first CMOS inverter, the output impedance Zout (=Z1+Rs) of the driver 71 has a characteristic that the graph of FIG. 9B is shifted Rs upward. That is, the output impedance Zout of the driver 71 changes according to output voltage of the driver 71.

If the resistance Rs of the resistor 74 is considerably larger than the on-state resistance Ron of the NMOS transistor, the change of the output impedance Zout of the driver is relatively small. Thus, a ratio of the resistance Rs of the resister 74 to the output impedance Z1 of the first CMOS inverter becomes large, it becomes possible to ignore the change of the output impedance Z1 of the first CMOS inverter.

However, it is necessary that the output impedance Zout of the driver 71 is (nearly) equal to the impedance Z0 of the transmission line 73. Accordingly, the on-state resistance Ron of the NMOS transistor must be reduced to increase the ratio of the resistance RS of the resistor 74 to the output impedance Z1. To reduce the resistance Ron of the NMOS transistor, the NMOS transistor must be enlarged in size. However, this goes against a request of miniaturization.

Therefore, the ratio of the resistance Rs of the NMOS transistor to the output impedance Z1 of the CMOS inverter is decided so that the NMOS transistor is not very large and the I-V characteristic of the driver 71 can be considered to a linear characteristic. For example, the output impedance Zout of the driver 71 is within plus or minus 10 percent of the impedance Z0 of the transmission line 73 over its total operating range (or its total output voltage range).

Although the ratio of the resistance Rs of the resistor 74 to the output impedance Z1 of the first CMOS inverter is decided as the example mentioned above, there is a maximum of 10 percent difference between the output impedance Zout of the driver 71 and the impedance Z0 of the transmission line 73. Accordingly, the resistance Rs of the resistor 74 must be decided to lengthen a period that the output impedance Zout of the driver 71 is equal to the characteristic impedance Z0 of the transmission line 73 as long as possible.

That is, the resistance Rs of the resistor 74 must be decided so that the output impedance Zout of the driver 71 is (nearly) equal to the characteristic impedance Z0 of the transmission line 73 when a driving signal supplied to the CMOS inverter of the driver 71 has a logical low level or a logical high level. Additionally, a degree of equality between the output impedance Zout and the characteristic impedance Z0 is decided on the basis of balance between the on-state resistance of the driver 71 and the resistance Rs of the resistor 74.

Figure 10:
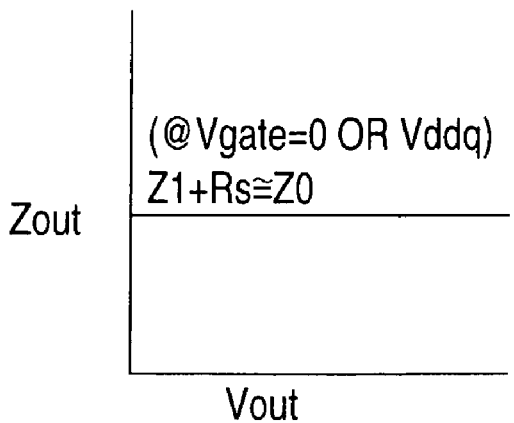
FIG. 10 is a graphic diagram showing an output impedance characteristic of the driver of the semiconductor apparatus of FIG. 7.

In the above case, when the driving signal does not have the logical low or high level (or when the driving signal changes from the logical low or high level to the logical high or low level), the output impedance Zout of the driver 71 is approximate to the characteristic impedance Z0 of the transmission line 73, however, does not match the characteristic impedance Z0 of the transmission line 73. When the output impedance Zout of the driver 71 does not match the characteristic impedance Z0 of the transmission line 73, the reflected wave returning to the driver 71 is reflected by the driver 71 (or at the driver-side end of the transmission lien 73). Length of the transmission line 73 is decided to prevent the reflected wave from being reflected by the driver 71. That is, the length of the transmission line 73 is decided so that the reflected wave from the receiver 72 reaches the driver 71 while the output impedance Zout of the driver 71 matches the characteristic impedance Z0 of the transmission line 73. Concretely, the length of the transmission line 73 is decided on the basis of a predetermined data rate, rise time and fall time of the driving signal supplied to the driver 71 so that the reflected wave from the receiver 72 reaches the driver 71 while the driving signal has the logical high or low level and thereby the output impedance Zout of the driver 71 is regarded as equivalent of the characteristic impedance Z0 regardless of the output voltage Vout as illustrated in FIG. 10.

Figure 11:
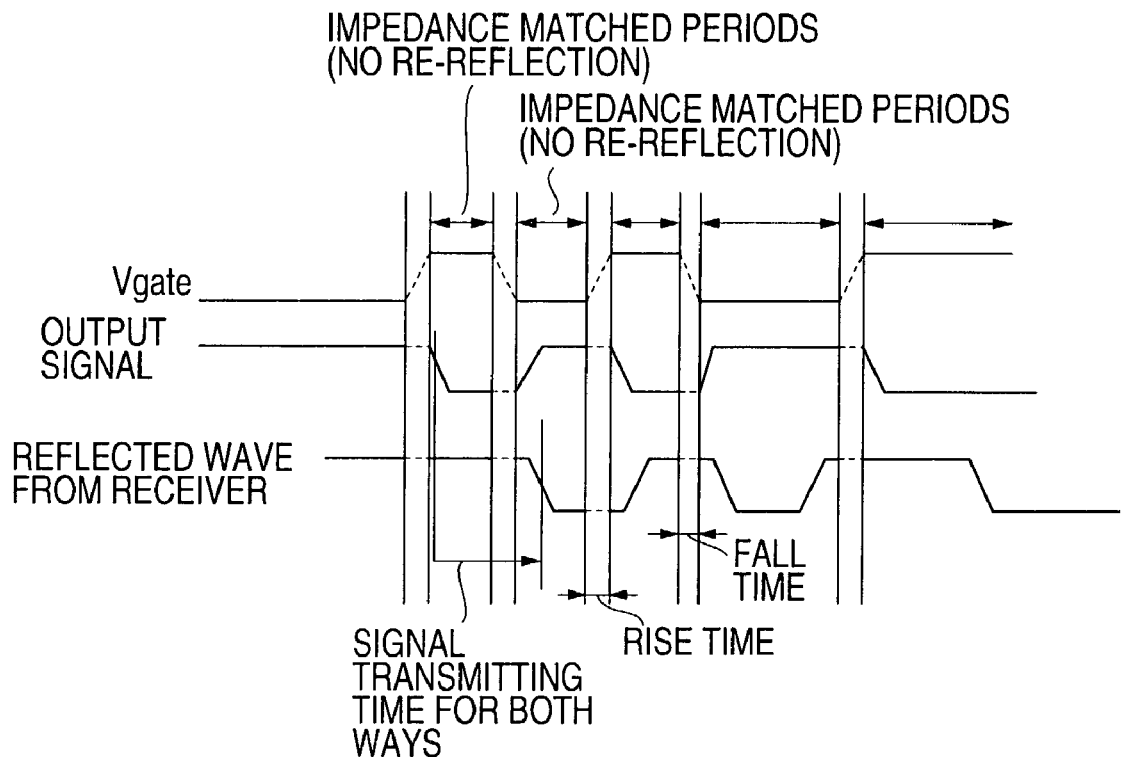
FIG. 11 is a timing chart for describing an operation of the driver of the semiconductor apparatus of FIG. 7.

FIG. 11 shows a timing chart of the driving signal (i.e. Vgate), the output signal of the driver 71 and the reflected wave from the receiver 72. As easily understood from FIG. 11, the length of the transmission line 73 is decided so that the reflected wave from the receiver 72 reaches the driver 71 while the driving signal has the logical high or low level.

Oppositely, the predetermined data rate of the driving signal may be decided according to the length of the transmission line 73 in consideration of the rise time and the fall time of the driving signal so that the driving signal has the logical high or low level when the reflected wave from the receiver 12 reaches the driver 71.

As described above, the semiconductor apparatus of this embodiment can match the output impedance of the driver 71 to the characteristic impedance Z0 of the transmission line 73 by using the resistor 74 located (or formed) in the driver 71. Therefore, the semiconductor apparatus can prevent the output signal from overshooting and prevent multiple reflection between the driver 71 and the receiver 72 from occurring. Furthermore, because the resistor 74 has the resistance Rs considerably larger than the on-state resistance of the CMOS inverter (or MOS transistor) of the driver 71, the I-V characteristic of the driver 71 are approximate to a linear characteristic. The resistor 74 does not waste electric power differently from the terminating resistor of the related semiconductor apparatus. In addition, because the resistor 74 can be made during the process for forming the CMOS inverters, the number of processes and the production cost for manufacturing the semiconductor apparatus are hardly increased. Furthermore, because the resistor 74 is used for the termination of the transmission line 73, it is unnecessary to specially control termination of the transmission line 73.

Still furthermore, it is easy to test the driver 71 because it is enough that its predetermined DC characteristic satisfy necessary conditions.

This invention is particularly intended for a case where the driving signal supplied to the driver is the logical (or pulse) signal with a frequency over gigahertz. This is based on the following reasons.

In a case where the driver and the receiver are formed as different devices and the transmission line connects the driver to the receiver, impedance Z of the transmission line is given by:

$$Z=\sqrt{\{(R+j\omega L)/(G+j\omega C)\}} \quad (1)$$

where R: resistance, G: conductance, L: inductance, C: capacitance, and $\omega=2\pi f$.

Generally, the transmission line is made on a printed circuit board (PCB). In such a case, the resistance and the conductance are considerably larger than the inductance and the capacitance, respectively. Accordingly, the equation (1) is regarded as the following equation.

$$Z=\sqrt{L/C} \quad (2)$$

When the transmission line has the impedance of the equation (2), a velocity v of a signal transmitted on the transmission line is given by:

$$v=1/\sqrt{L*C}$$

The velocity v is equal to the light velocity c in a vacuum and to $c/\sqrt{\epsilon r}$ in a case of practical specific inductive capacity $\epsilon r$. Thus, it is realizable to transmit the signal at high speed between the different devices.

On the other hand, in a case where the driver and the receiver are formed in a device, the transmission line connecting the driver to the receiver has very large resistance. That is, the resistance R is lager than the inductance L (i.e. R>L). Because the transmission line has a time constant $\tau$ (=RC) in this case, velocity of the signal with low frequency depends on the resistance R. Therefore, the following inequalities must be valid to realize high speed transmission realizable between the different devices as mentioned above.

$$R<<j\omega L, G<<j\omega C$$

Accordingly, the driving signal must have a frequency of a few gigahertz.

Thus, the driver and the receiver of this invention are driven by the logical (or pulse wave) signal with the high frequency over gigahertz.

When the driver is driven the logical signal with the high frequency over gigahertz, a voltage noise (caused by multiple reflection) becomes remarkable in the related semiconductor apparatus as shown in FIG. 1. The multiple reflection causes the following problems.

(I) The multiple reflection reduces voltage amplitude of input signal supplied for the receiver. Consequently, it is impossible to obtain a sufficient gain in the receiver.

(II) The multiple reflection reduces a slew rate (dV/dt) of the input signal for the receiver. A response of the receiver to the input signal becomes slow because of a small slew rate. Therefore, the receiver can not follow the high frequency driving signal of the driver.

(III) The multiple reflection causes a ringing on the input signal of the receiver. When the ringing has a level varying across a judging level of the receiver, the receiver makes judging errors and/or the response of the receiver becomes slow.

Thus, the multiple reflection brings errors to the receiver.

Figure 12:
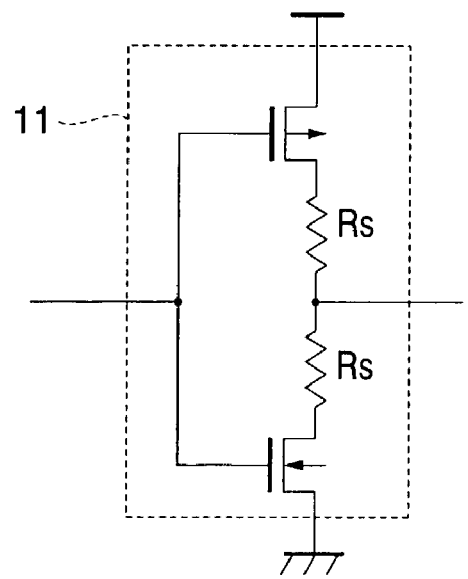
FIG. 12 is a circuit diagram of a CMOS inverter according to another embodiment of this invention.

While this invention has thus far been described in conjunction with the preferred embodiment thereof, it will readily be possible for those skilled in the art to put this invention into practice in various other manners. For example, as illustrated in FIG. 12, two resistors connected to the PMOS and NMOS transistors of the CMOS inverter for the driver 71 may be used instead of the resistor 74. The driver 71 may comprise a buffer consists of only one NMOS transistor, a differential amplifier or the like. At any late, it is enough that the driver 71 includes one MOS transistor with a gate for receiving the driving signal and the resister 74 connected to a source or a drain of the MOS transistor. The receiver 72 is the same as the driver 71.

Furthermore, the transmission line 73 may have a plurality of branches at a receiver side to be connected to a plurality of receivers on condition that each of the branches has a negligible length against the full length of transmission line 73. For instance, the branches can be disregarded when each of them is smaller than 0.1 percent of the transmission line 73 in length. The plural receivers may be different from one another. For instance, one of the plural receivers is for rising edges the output signal of the driver while the other is for falling edges of the output signal. The output signal of the drive may be a clock signal.

In addition, there is not particular restriction about circuits located before the driver and after the receiver. Furthermore, this invention is not applicable to only inside transmission of a device but also device-to-device transmission (or a transmission apparatus comprising a driver, a receiver and a signal line connected between the driver and the receiver).

What is claimed is:

1. A semiconductor apparatus having a driver with a driving device and a transmission line connected to an output side of said driver, said driver having output impedance, said driving device having on-state resistance, said transmission line having impedance, said semiconductor apparatus comprising:

a resistor formed in said driver for connecting said driving device to said transmission line, wherein said resistor has resistance sufficiently greater than said on-state resistance to render any change of said on-state resistance due to a voltage dependence negligible with respect to the output impedance on condition that said output impedance of said driver matches said impedance of said transmission line and wherein multiple reflections in said transmission line are suppressed without having an additional resistor on a receiving side of said transmission line.

2. A semiconductor apparatus as claimed in claim 1, said driver driven by a driving signal varying between a logical high level and a logical low level, wherein said on-state resistance and said resistance of said resistor are decided so that said output impedance matches said impedance of said transmission line when said driving signal has said logical high level or said logical low level.

3. A semiconductor apparatus as claimed in claim 2, said driving signal having a predetermined data rate, rise time and fall time, said driver transmitting an output signal on said transmission line in response to said driving signal, said transmission line has an end reflecting said output signal for said driver as a reflected wave, wherein said transmission line has length decided on the basis of said predetermined data rate, said rise time and said fall time of said driving signal so that said reflected wave reaches said driver while said driving signal has said logical high level or said logical low level.

4. A semiconductor apparatus having a driver with a driving device and a transmission line connected to an output side of said driver, said driver having output impedance and a current-voltage characteristic, said driving device having on-state resistance, said transmission line having impedance, said semiconductor apparatus comprising:
a resistor located in said driver for connecting said driving device to said transmission line to match said output impedance with said impedance of said transmission line, wherein
said resistor has resistance which is sufficiently greater than said on-state resistance to render any change of said on-state resistance due to a voltage dependence negligible with respect to the output impedance and wherein multiple reflections in said transmission line are suppressed without having an additional resistor on a receiving side of said transmission line.

5. A semiconductor apparatus as claimed in claim 4, said driver driven by a driving signal varying between a logical high level and a logical low level, wherein
said on-state resistance and said resistance of said resistor are decided so that said output impedance matches said impedance of said transmission line when said driving signal has said logical high level or said logical low level.

6. A semiconductor apparatus as claimed in claim 5, said driving signal having a predetermined data rate, rise time and fall time, said driver transmitting an output signal on said transmission line in response to said driving signal, said transmission line has an end reflecting said output signal for said driver as a reflected wave, wherein
said transmission line has length decided on the basis of said predetermined data rate, said rise time and said fall time of said driving signal so that said reflected wave reaches said driver while said driving signal has said logical high level or said logical low level.

7. A semiconductor apparatus as claimed in claim 4, wherein said driving device comprises a CMOS inverter.

8. A semiconductor apparatus as claimed in claim 4, wherein said driver is connected to one end of said transmission line, and said semiconductor apparatus further comprises a driven device connected to the other end of said transmission line, said driven device comprising at least a CMOS inverter.

9. A driving method for driving semiconductor apparatus by the use of a driving signal varying between a logical high level and a logical low level, said semiconductor apparatus having a driver with a driving device and a transmission line connected to said driver, said driver having current-voltage characteristic and output impedance, said driving device having on-state resistance, said transmission line having impedance and an end reflecting an output signal from said driver as a reflected wave, comprising the steps of:
previously locating a resistor in said driver for connecting said driving device to said transmission line to match said output impedance with said impedance of said transmission line when said driving signal has said logical high level or said logical low level, said resistor having resistance sufficiently greater than said on-state resistance to render any change of the on-state resistance due to a voltage dependency negligible with respect to the output impedence; and supplying said driving signal with a predetermined data rate to said driver, said predetermined data rate decided so that said driving signal has said logical high level or said logical low level when said reflected wave reaches said driver and wherein multiple reflections in said transmission line are suppressed without having an additional resistor on a receiving side of said transmission line.

10. A semiconductor apparatus comprising:
a driver having an MOS transistor with a gate supplied with a driving signal and a resistor with two terminals connected to one end of a transmission line and to a source or a drain of said MOS transistor; and
a receiver connected to the other end of said transmission line, wherein
said resistor has resistance which substantially matches output impedance of said driver with impedance of said transmission line while said driving signal has logical high or low level and wherein multiple reflections in said transmission line are suppressed without having an additional resistor on a receiving side of said transmission line, said resistance is set to be sufficiently greater than a on-state resistance of the MOS transistor to render any change of said on-state resistance due to a voltage dependence negligible with respect to the output impedance.

11. A semiconductor apparatus as claimed in claim 10, wherein said transmission line has length so that a reflected wave from said receiver reaches said driver while said output impedance of said driver matches said impedance of said resistor.

12. A setting method for setting semiconductor apparatus which comprises a driver and a receiver, said driver having an MOS transistor with a gate supplied with a driving signal and a resistor with two terminals connected to one end of a transmission line and to a source or a drain of said MOS transistor, said receiver connected to the other end of said transmission line, comprising the steps of:
previously finding electric characteristics of said semiconductor apparatus without said resistor;
setting resistance of said resistor on the basis of said electric characteristics so that output impedance of said driver substantially matches impedance of said transmission line while said driving signal has logical high or low level and wherein multiple reflections in said transmission line are suppressed without having an additional resistor on a receiving side of said transmission line; and
setting length of said transmission line so that a reflected wave from said receiver reaches said driver while said output impedance of said driver matches said impedance of said transmission line.

13. A setting method as claimed in claim 12, wherein the setting step is executed so that said driving signal has logical high or low level when a reflected wave from said receiver reaches said driver.

14. A setting method as claimed in claim 12 further comprises the step of:
setting said resistance of said resistor to be larger than on-state resistance of said MOS transistor.

* * * * *